Dec. 30, 1969 R. P. JAMES 3,486,228
DEVICE FOR CUTTING ROOFING AND THE LIKE
Filed Sept. 12, 1967

INVENTOR.
RUSSELL P. JAMES,
BY
Berman, Davidson & Berman
ATTORNEYS.

United States Patent Office 3,486,228
Patented Dec. 30, 1969

3,486,228
DEVICE FOR CUTTING ROOFING AND THE LIKE
Russell P. James, P.O. Box 148,
Avon Park, Fla. 33825
Filed Sept. 12, 1967, Ser. No. 667,192
Int. Cl. B26b 27/00
U.S. Cl. 30—294                                             2 Claims

ABSTRACT OF THE DISCLOSURE

A device for cutting roofing and the like comprising: a plow member, a blade extending above said plow member, a handle secured to said blade member and a pulling means extending forwardly of said blade.

---

The present invention relates to a simple but intensely specialized device for achieving an incredibly difficult result, namely, the cutting and freeing up of old roofing materials. One is not very apt to tear up new or recently laid roofing. Accordingly, to appreciate the job which must be done, one should study some of the architectural catalogs specifying roofing and issued in the early 1950's. An inspection of such catalogs show that from three to eight plies of material ranging from ordinary roofing paper to asphalt-asbestos felt, rubberized felt, and similar materials are apt to be encountered and in specifying such plies, many of the old catalogs call for from 4 to 15 inches of overlap between adjacent plies which potentially at least greatly multiplies the number of thickness of plies which must be severed. Any such job as tearing up roofing made according to any such specifications has nothing more than superficial external resemblances to the job of cutting linoleum or carpeting.

The present device is of simple construction for the equally simple reason that complex devices simply cannot be dragged through the kind of resistance encountered in cutting through old roofing.

The primary object of this invention is to provide a device which will perform the extremely difficult cutting job above described and in which all parts of the device contribute to the performance of this particular specialized function.

The above and other objects will be made clear from the following detailed description taken in connection with the annexed drawing, in which.

Figure 1:
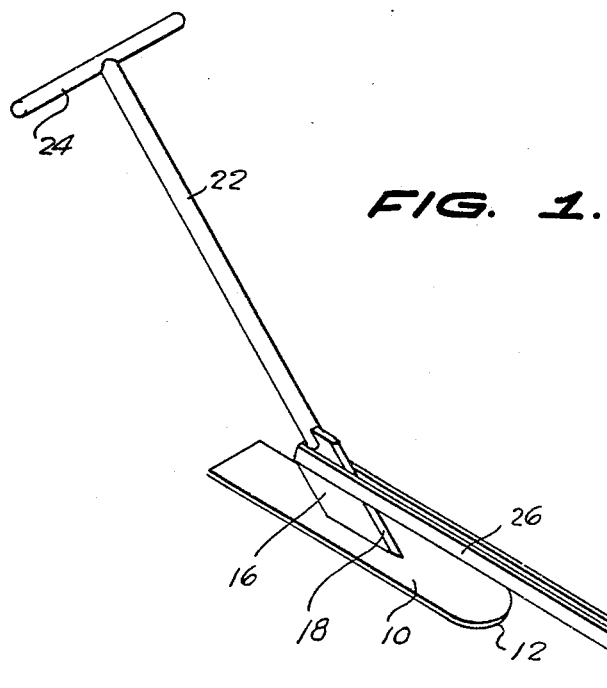
FIGURE 1 is a perspective view of the improved device.
Figure 2:
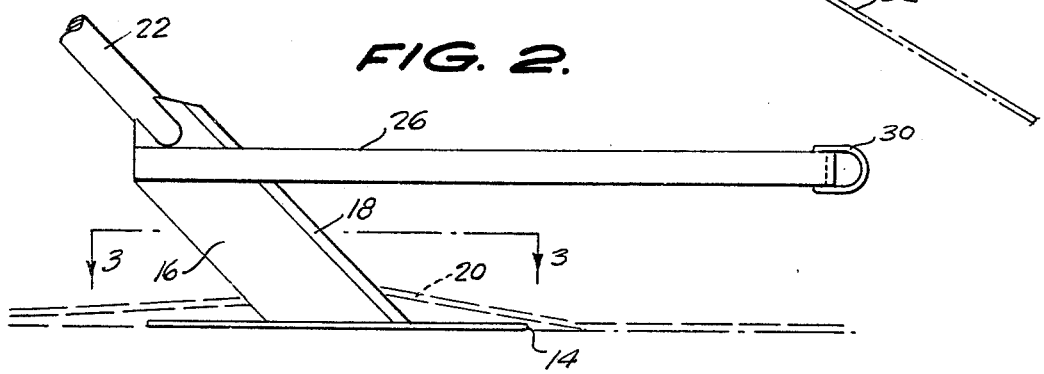
FIGURE 2 is a side elevation, showing the device in use.
Figure 3:
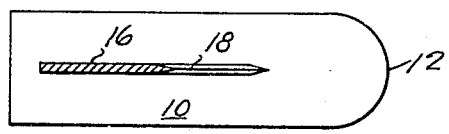
FIGURE 3 is a section on the line 3—3 of FIGURE 1.

Referring now to FIGURE 1, the device comprises a flat sheet of reasonably heavy metal 10 having a rounded leading edge 12 which is also rounded across the plane of the plow, as indicated at 14 in FIGURE 2. A rugged blade member 16 is welded in or otherwise secured centrally of the plow 10 and has a sharpened edge 18 directed forwardly along the center line of the plow 10 and toward the rounded end 12.

The double rounding of the end 12 is of considerable importance. Any attempt to make a chiseled or beveled edge instead of the curvature 14 almost certainly would result in the device following the substructure with distinct and severe damage to such substructure and altogether intolerable wear on the plow 10. The rounded edge 14, which is acting against multiple plies of thick material produces an ample bulge in the material, as indicated by the dotted lines 20 in FIGURE 2, so that the edge 18 of the blade 16 has full and complete access to the material raised by the leading edge 14 of the plow 10.

A handle shaft 22 is secured to the upper edge of the blade 16 and terminates in a cross bar 24. The operator grasping the bar 24 performs only a guiding and starting function. The actual motive power, and it is very considerable, is supplied by means of a strap member 26 which goes around the rear of a vertical portion 28 formed at the upper end of the blade 16. A ring 30 engages the forward end of the strap 26 and is secured to a cable 32 which may be attached to a winch, a tractor or truck at ground level to supply an adequate pull to advance the blade 18 through the extremely tough and heavy material which must be cut.

It is important that the strap 26 at its lower edge be at least 6 or 6½ inches above the upper surface of the plow 10 in order to accommodate the thickness of the material 20 and any bulges or wrinkles which may occur as the blade 16 is dragged through the material.

While certain specific details have been disclosed herein, it is not intended to limit this invention to the precise details disclosed but only as set forth in the subjoined claims.

What is claimed is:

1. Means for cutting old roofing comprising: a flat horizontally disposed plow member having a blunt, laterally rounded forward end; a rearwardly inclined blade secured to and projecting upwardly from said plow and having its cutting edge facing said forward end, and tension means extending forwardly of and connected to the upper end of said blade for advancing said blade and plow, and including manually operable guiding means secured to and extending rearwardly of said blade above said tension means.

2. Means as set forth in claim 1, in which said manually operable means comprises a shaft secured to said blade and a cross bar handle secured to said shaft.

References Cited

UNITED STATES PATENTS

| | | | |
|---|---|---|---|
| 620,421 | 2/1899 | Cox | 172—19 |
| 420,071 | 1/1890 | Johnson | 172—20 |
| 256,700 | 4/1882 | Jincks | 30—294 |
| 1,589,156 | 6/1926 | Hartman | 30—317 X |
| 2,398,979 | 4/1946 | Vaughan | 30—289 X |

FOREIGN PATENTS 1,064,343  12/1953  France.

ROBERT C. RIORDON, Primary Examiner
J. C. PETERS, Assistant Examiner